(12) United States Patent
Kim et al.

(10) Patent No.: US 11,046,178 B1
(45) Date of Patent: Jun. 29, 2021

(54) VEHICLE SAFETY AND POWER GENERATING SYSTEM

(71) Applicant: K-TECHNOLOGY USA, INC., Los Angeles, CA (US)

(72) Inventors: Ki Il Kim, Los Angeles, CA (US); Young Kim, Los Angeles, CA (US); Sarah Duncanson, Los Angeles, CA (US); Paul Kim, Beverly Hills, CA (US)

(73) Assignee: K-TECHNOLOGY USA, INC., Los Angeles, CA (US)

( * ) Notice: Subject to any disclaimer, the term of this patent is extended or adjusted under 35 U.S.C. 154(b) by 0 days.

(21) Appl. No.: 17/105,959

(22) Filed: Nov. 27, 2020

(51) Int. Cl.
  *B60K 25/08* (2006.01)
  *H02K 7/18* (2006.01)
  *B60K 1/04* (2019.01)

(52) U.S. Cl.
  CPC .......... *B60K 25/08* (2013.01); *H02K 7/1846* (2013.01); *B60K 2001/045* (2013.01); *B60K 2001/0416* (2013.01)

(58) Field of Classification Search
  None
  See application file for complete search history.

(56) References Cited

U.S. PATENT DOCUMENTS

| | | |
|---|---|---|
| 6,292,901 B1 | 9/2001 | Lys et al. |
| 7,687,943 B2 | 3/2010 | Lunde |
| 8,439,140 B1 * | 5/2013 | Amortegui ............. B60K 25/08 |
| | | 180/65.51 |
| 8,643,201 B2 * | 2/2014 | Scott .................... H02K 7/1846 |
| | | 290/1 R |
| 8,827,022 B2 | 9/2014 | Jaberian |
| 9,379,576 B2 | 6/2016 | Al Jaeedi |

(Continued)

FOREIGN PATENT DOCUMENTS

CN 201254089 Y 6/2009

OTHER PUBLICATIONS

Pacific Northwest National Laboratory, "'Better' Copper Means Higher-Efficiency Electric Motors", published Oct. 13, 2020, archived by the Internet Archive Wayback Machine on Oct. 17, 2020, (Year: 2020).*

*Primary Examiner* — Jonathan M Dager
*Assistant Examiner* — Garrett F Evans
(74) *Attorney, Agent, or Firm* — Novick, Kim & Lee, PLLC; Jae Youn Kim

(57) ABSTRACT

Proposed is a vehicle safety and electricity generating system which includes a wheel rim; an axle shaft connected with the wheel rim; and a first generator. To prevent rollover and to recharge electricity to batteries as quickly as possible, the vehicle can have an extended body and two more attached wheels, and the system can be installed thereto. The system especially provides a rectifier for boosting 600-690 volt AC to 840-966 DC that is enough to charge electric vehicles for example, GM, Rivian® motor that requires 800-900 volt DC for a quick charger. Therefore, there is no need outside high voltage connections. Further, to reduce a generator's size and weigh about by 50% and increase conductivity, the generator has wires selected from one of a super conducting wire, a carbon CNT wire, graphene cooper composited wire or graphene film wire instead of conventional heavy weight cooper wires.

7 Claims, 4 Drawing Sheets

(56) References Cited

U.S. PATENT DOCUMENTS

| | | |
|---|---|---|
| 2001/0008191 A1 | 7/2001 | Kinchen et al. |
| 2006/0061105 A1 | 3/2006 | Yun |
| 2007/0187957 A1* | 8/2007 | Harrison .................. F03G 7/08 290/1 R |
| 2008/0084071 A1 | 4/2008 | Zhu |
| 2009/0315338 A1 | 12/2009 | Ylvisaker |
| 2010/0270810 A1 | 10/2010 | Liebermann |
| 2012/0152634 A1 | 6/2012 | Skis |
| 2013/0098699 A1 | 4/2013 | Francis |
| 2015/0167796 A1 | 6/2015 | Noguchi et al. |
| 2020/0235440 A1* | 7/2020 | Hao .................... H01M 10/425 |

* cited by examiner

VEHICLE SAFETY AND POWER GENERATING SYSTEM

BACKGROUND OF THE INVENTION

1. Field of the Invention

One or more embodiments of the present invention relate to a vehicle safety and power generating system.

2. Description of the Related Art

For vehicles, safety is one of important issues for saving drivers and passengers, and therefore some large buses especially sightseeing buses have an additional rear axle assembly with two extra wheel and tires located in the back of a main rear axle assembly to enhance safety.

Further, the government has new green energy policies and trillions of dollars in budget, but green energy production is limited in the current technologies to cover billions of vehicles.

Further, one of core problems of electric vehicles is of a "quick charger." For a quick charge purpose of the electric cars, a high voltage (e.g., DC 800-900 volts) is required, but providing such high voltage to electric cars is not cost effective, and is not permitted in residential zones.

SUMMARY OF THE INVENTION

In consideration of the above problems, for saving the life and property, one aspect of the present invention is to propose adding two extra rear wheel and tires to all vehicles.

Another aspect of the present invention is to provide an advanced safety and self-power generating system to cover the both purposes with little modification of a vehicle structure.

Another aspect of the present invention is to provide an 800-900 DC voltage to electric vehicles with a rectifier for the quick charger, and therefore they can be charged within 10-15 minutes.

Another aspect of the present invention is to provide a generator in which new super conducting wires or graphene with copper wires are selectively used as winding wires for reducing the size and weight of the power generating system by at least 50%.

Another aspect of the present invention is to provide a small power generating system having a small power generator and small tires installed on a shaft and engaged with at least one vehicle main wheel and tire, the small tires rotating reversely with respect to the main wheel and tire, for generating power while driving. The small power generator's ratio can be 20 KW.

Another aspect of the present invention is to provide a large power generating system attached to a vehicle body and having a long generator axle shaft and two tires attached to the ends of the axle shaft, when driving the vehicle, the two tires are in contact with the ground and rotate with other tires at a same speed, the system including a large power generator producing power and suppling the power to batteries and capacitors, in which the batteries can be new graphene synthetic batteries for a quicker charge selectively. The large power generator's ratio can be 60 KW.

As an embodiment of the present invention, a vehicle safety and electricity generating system for a vehicle is proposed. This system can include: a wheel and tire assembly including a tire and a wheel rim; an axle shaft connected with the wheel rim; and a first generator, wherein the wheel rim includes: a rim bed; an inner rim flange integrally and continuously connected with the rim bed; and a rim pulley integrally and continuously connected with and extended from the inner rim flange, and wherein the rim pulley is connected with the first generator through a belt.

The system can further include a second generator which is larger than the first generator in size and capacity, wherein the axle shaft has a first portion directly connected to the wheel rim and a second portion connected to the first portion and the second generator, and wherein a diameter of the first portion is larger than that of the second portion.

The second portion of the axle shaft passes through the second generator and directly rotates the second generator for generating electricity.

Further, at least one of the first and second generators is connected to an automatic voltage rectifier, an automatic frequency regulator, or a combination thereof.

Further, the vehicle can be an electric vehicle, and the system is configured to generate electricity of 800-900 DC volts so as to charge batteries of the electric vehicle, by using the automatic voltage rectifier.

Further, the first generator includes a superconducting wire or a graphene wire configured to increase conductivity and reduce the weight and size thereof.

Further, the second generator includes a superconducting wire or a graphene wire configured to increase conductivity and reduce the weight and size thereof.

Further, when the wheel rim rotates, the first and second generators produce electricity charged to a battery of the vehicle.

Further, wherein the vehicle has a front axle shaft assembly disposed in a front portion thereof, a front-rear axle shaft assembly disposed in a rear portion thereof, and a rear-rear axle shaft assembly disposed adjacent to and in rear of the front-rear axle shaft assembly, and the system is installed on the rear-rear axle shaft assembly for safety of rollover protection.

Further, the rim pulley includes a groove disposed on a circumference thereof, and the belt is coupled to the groove.

Further, the graphene wire can be a graphene with copper composited wire, a graphene film composited wire, or a carbon nanotube wire.

Further, the automatic frequency regulator controls 50-60 Hz when driving while driving.

As another embodiment of the present invention, a vehicle safety and electricity generating system is proposed. This system can include a wheel and tire assembly having a tire and a wheel rim; a first generator connected to a shaft for generating electricity; a roller connected to an end of the shaft and in contact with the tire, such that the roller rotates with the tire in a reverse direction of the tire by friction therebetween; an axle shaft connected to the wheel rim; a second generator connected to the axle shaft for generating electricity; and a rectifier connected to the first and second generator for rectifying the generated electricity, wherein the first and second generators respectively include a superconducting wire or a graphene wire configured to increase conductivity and reduce the weight and size thereof.

Further, this system can include a coupling connected to the roller shaft at one end and the first generator at another end, and configured to couple or decouple the roller shaft.

Further, the axle shaft has a first portion directly connected to the wheel rim and a second portion connected to the first portion and the second generator, and wherein a diameter of the first portion is larger than that of the second portion.

As another embodiment of the present invention, a vehicle safety and electricity generating system for an electric vehicle is proposed. This system can include a wheel and tire assembly having a tire and a wheel rim; an axle shaft connected to the wheel rim; and a first generator connected to the axle shaft for generating electricity and connected to at least one of an automatic voltage rectifier, an automatic frequency regulator, or a combination thereof to rectify the generated electricity from an AC to a DC volt so as to charge batteries of the electric vehicle, wherein the first generator includes at least one of a superconducting wire, a carbon nanotube (CNT) wire, a graphene and copper composited wire, a graphene film composited wire or a graphene wire configured to increase conductivity and reduce the weight and size thereof.

Further in this system, the wheel rim includes a rim bed; an inner rim flange integrally and continuously connected with the rim bed; and a rim pulley integrally and continuously connected with and extended from the inner rim flange.

Further this system can include a second generator having a shaft connected to the rim pulley through a belt.

Further, the graphene wire can be a graphene with copper composited wire, a graphene film composited wire, or a carbon nanotube wire.

Further, an another embodiment of the invention, the electric vehicle has a front axle shaft, a front-rear axle shaft, and a rear-rear axle shaft disposed in rear of the front-rear axle shaft, and the system is installed on the rear-rear axle shaft of the electric vehicle for rollover prevention and generating electricity for charging to the batteries.

Additional aspects will be set forth in part in the description which follows and, in part, will be apparent from the description, or may be learned by practice of the presented embodiments.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numbers indicate identical or functionally similar elements.

DETAILED DESCRIPTION

Figure 1:
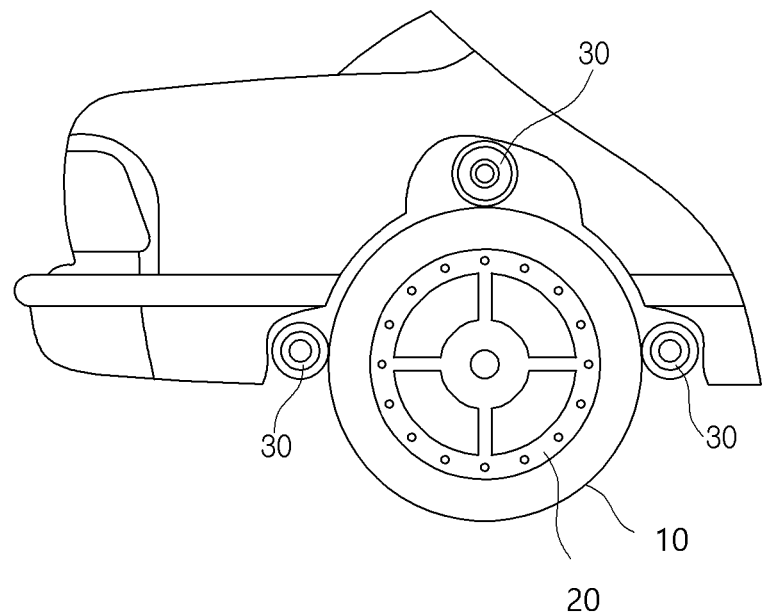
FIG. 1 illustrate a side view of a vehicle power generating system as one embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second, and the like may be used to describe various elements, but do not limit the elements. Such terms are only used to classify one element from another.

Figure 2:
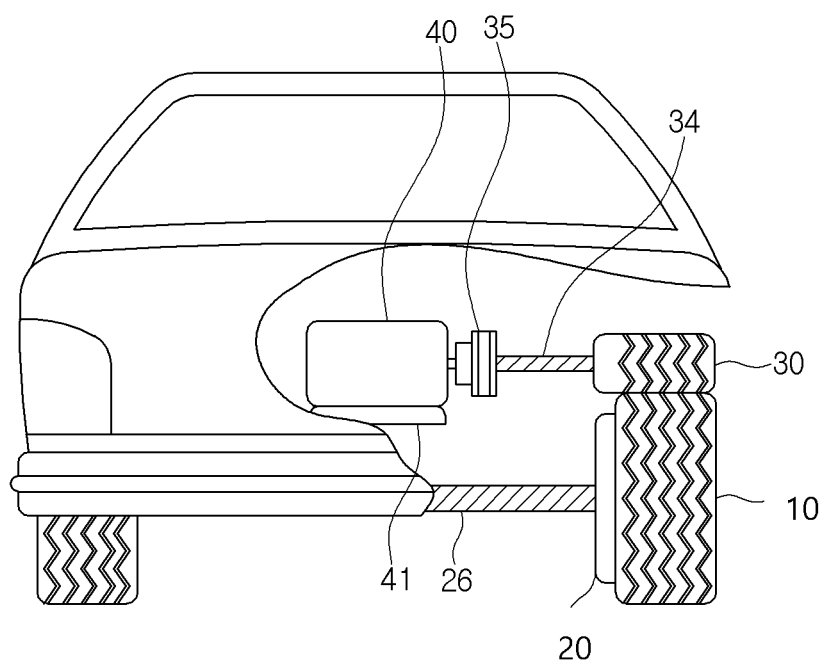
FIG. 2 is a rear view of the power generating system of FIG. 1.

FIGS. 1 and 2 respectively show a side and a rear views of a vehicle power generating system of the present invention as one embodiment of the present invention. In particular, FIG. 1 shows the locations of small tires 30. There can be three locations for the small tire 30 in this embodiment as a non-limiting and illustrative example. This system can use at least one of the three tires 30. These small tires 30 can be made of the same material as the large tire 10, such as rubber, and are located such that the small tires 30 are in contact and engaged with the large tire 10, and thus rotate with the large tire 10 rotated by an axle shaft 26 when the vehicle runs. The small tire 30 can be a rubber wheel tire, metal wheel tire, or plastic wheel tire depending the vehicle's main wheel tires.

This system further includes a wheel and tire assembly which includes a wheel rim 20 and the large tire 10. As an example, in this embodiment, the large tire 10 is of a rear wheel and tire assembly of the vehicle, and at least one of the three small tires 30 can be in close contact with it and can be selectively or collectively located on the top, front and rear sides of the large tire 10 as shown in FIG. 1. Preferably, one small tire 30 can be installed on one of the top, front and rear sides of the large tire 10. The small tire 30 can be a soft roller with a circular and cylindrical shape, made of the same material as the large tire 10, as they rotate with the large tire 10 in friction. The inside of the small tire 30 can be solid or hollow.

Referring to FIG. 2, the vehicle power generating system can include a small generator 40 fixed to an installation bracket 41, which can be an alternator. The small generator 40 can be connected with the small tire 30 through a shaft 34. As an example, in this embodiment, the small generator 40 is connected with the top small tire 30, through the shaft 34 which transfers the rotational force of the small tire 30 to the small generator 40. Further, a coupling 35 connected with the small generator 40 is disposed between the shaft 34 and the small generator 40, which is configured to couple or decouple the shaft 34 with the small generator 40. This coupling 35 can be useful when replacing the small tire 30 without removing other parts of the system. Since the small tire 30 rotates with the large tire 10, it rotates reversely against the large tire 10 with the same linear speed, but an RPM of the small tire 30 is faster than that of the large tire 10, and thus the small generator 40 can produce electric power more efficiently which can be stored to a battery 60 of the vehicle.

This system as shown in FIG. 2 can be a both side system, having the same system as described on both sides. In FIG. 2, the system on one side is shown but the other side is not shown. The one side system can be adapted for a low speed RPM of 30 to 40 miles, and the other side system can be adapted for a high speed RPM of 60 to 80 miles for increasing power efficiency without a frequency regulator. Also, the small generator 40 of one system can have 50 Hz, and the small generator 40 of the other system can have 60 Hz, which can be installed separately on both sides.

Further, the RPM of the small generator 40 can be adjusted by selecting the sizes of the small tire 30. Most of power generating systems employ belts or gears to rotate generators, but this system does not use such belts or gears. As another embodiment, the small generator 40 can be a vertical generator which looks like a bicycle light generator.

Figure 3:
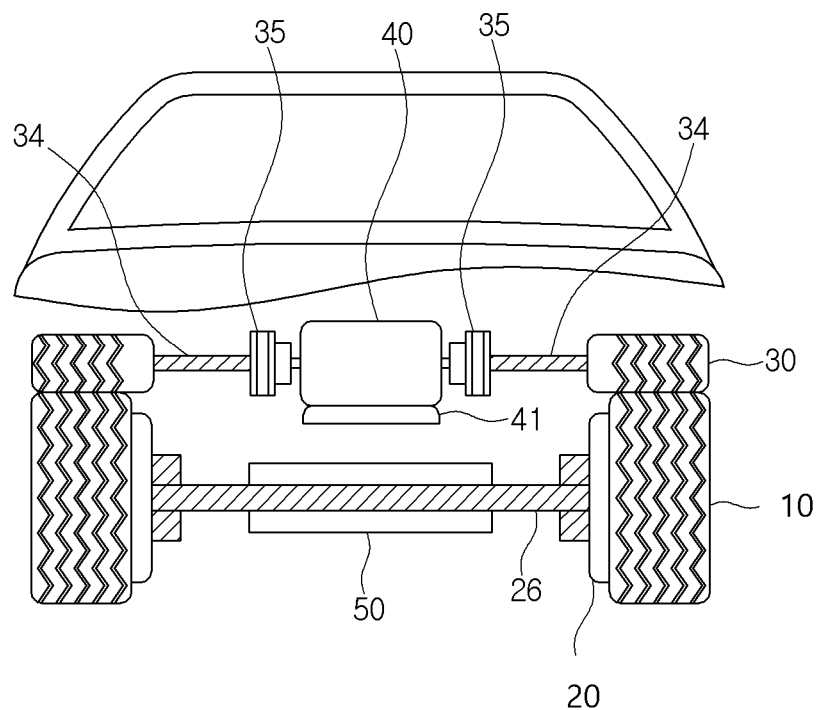
FIG. 3 is a rear view of a vehicle power generating system as another embodiment of the present invention.

Now referring to FIG. 3, as another embodiment of the present invention, a vehicle power generating system can include the system of FIG. 2 as described above. That is, this system as shown in FIG. 3 includes a first power generating system which can include a left small tire 30 and a right small tire 30, each being respectively connected with a left shaft 34 and a right shaft 34, both of which are connected with the small generator 40, through the couplings 35, respectively. The small generator 40 can have its own shafts on the left and right sides thereof, connected with the couplings 35, respectively. As an embodiment, the diameters of the generator shafts are smaller than those of the left and right shafts 34.

Furthermore, the vehicle power generating system as shown in FIG. 3 can include a second power generating system in combination with the first power generating system. The second power generating system uses the rotation of the axle shaft 26 which is connected with the wheel rim 20 of the rear wheel and tire assembly. In particular, the second power generating system includes a large generator 50 which has a capacity of generating 60 KW as an example, which is larger than the small generator 40 in capacity. The large generator 50 is directly installed on the axle shaft 26 at the central portion thereof. The axle shaft 26 can be directly used as the generator shaft for rotating the large generator 50 to generate electric power which can be stored to the battery 60, and passes through the large generator 50. Further, the axle shaft 26 has a diameter substantially larger in a portion close and adjacent to the wheel rim 10 than other portions thereof for safety of the vehicle, as shown in the second power generating system of FIG. 3.

The first power generating system of FIG. 3 is smaller than the second power generating system which is a large system producing more power and used mainly in the vehicle, such that the small first power generating system can be an optional system used when needed more power for the vehicle, and it can be set with a high speed 60-80 MPH with 60 Hz when needed selectively.

The first small power generating system can help greatly when uses braking. The both small and large systems can weight 500 LBS to 1,000 LBS depending on power consumption of the vehicle, and that weight can press down with reversing forces, therefore it prevents a rollover when turning curves just like a big sightseeing bus having a safety system with 2 extra wheels. This system of FIG. 3 can be a great safety feature as well as a system for generating power.

Figure 4:
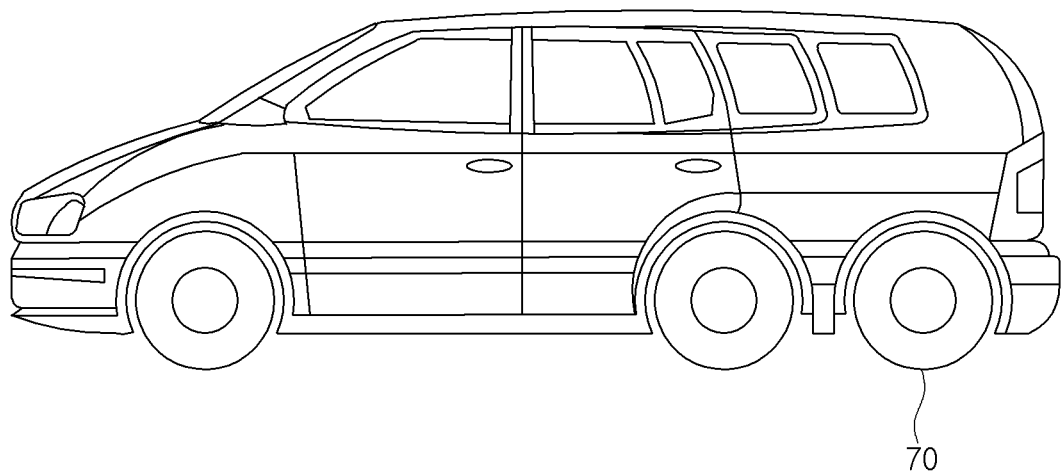
FIG. 4 is a side view of a vehicle power generating system as another embodiment of the present invention.

Referring to FIG. 4, as another embodiment of the present invention, the power generating systems as described above can be installed with an extra rear axle and/or rear wheel and tire 70. That is, the system can be installed in a vehicle having more than three axle shafts and six wheels such as in wagons, large vans and some trucks.

This multi-purpose power generating system as described above combines a safety system and a power generating system, and can be installed on a long axle shaft and can be attached to the main body of the vehicle.

Figure 5:
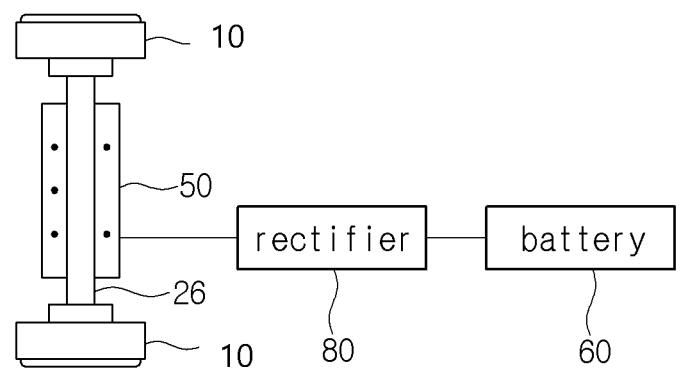
FIG. 5 is a top view of a vehicle power generating system as another embodiment of the present invention.

As another embodiment of the present invention, as shown in FIG. 5, the system provides the most advanced feature that is to produce the high voltage power for a quick charge. This system includes a rectifier 80, such that it can produce 800 to 900 DC volts by using the rectifier 80 and charge electric vehicles quickly enough. This rectifier 80 can rectify the AC generated by the generators 40 and 50 to DC and boost a high output voltage. The rectifier 80 can be disposed between the small generator 40 or large generator 50 and the battery 60, which can rectify the electricity generated by the small generator 40 or large generator 50 to produce the required power for the quick charge for most of electric vehicles in the market. As an example, the generator (e.g., Kato™ engineering generator) 40/50 can generate 600-690 Volt AC, which can be rectified to 840-966 Volt DC to charge the battery 60, such that a quick charge would be possible for electric vehicles such as GM's Hummer® and Rivian®.

This system can be installed on a front or rear axle shaft which is a driven shaft, depending on the type of vehicle whether it is a front or rear driven. For electric vehicles, this system even can be installed on a driving axle shaft whether it is front or rear or both. But, the preferable location of the system is on the rear axle shaft as shown in the figures for safety of rollover protection.

This power generating system has the generator 50 having a rotor and a stator built-in on the long axle shaft 26 connected to the both tires 10. When the system and extra two tires are attached to the vehicle, its weight and towing road are increased, so that the system can require more energy by about 10% more power (about 5-10 kwh), but it can produce up to 100-400 kWh by for example Hummer® V 1000 HP or Rivian® truck 750 HP, and both of the model's consumption is about 30-50 kw per 60 miles.

Furthermore, Pacific Northwest National Laboratory (PNNL) and GM® jointly developed graphene wires, and Texas Huston University also developed super conducting low cost CNT doped wires. As another embodiment of the present invention, these new wires can be used for the generators 40/50 so that the generator's 40/50 weight can be reduced by about at least 50% or more, and a quick charge is possible for electric vehicles in 10 minutes. Therefore, this safety and power generating system as described above can be applicable to many different kinds of electric vehicles efficiently for safety and environmental purposes with zero emission.

As another embodiment of the present invention, the system as shown in FIG. 5 can be installed at factory at the time of manufacture by automakers, but it also can be installed at auto body shops or dealers after market. For the after-market customers, the selection of power generating capacity of kilowatt can be set by vehicle makers depending on power requirement.

Figure 6:
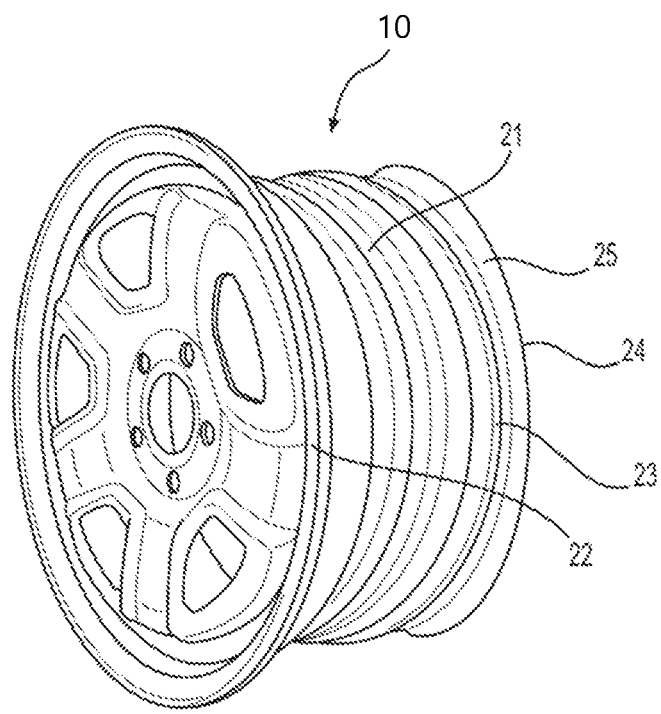
FIG. 6 is a perspective view of a vehicle rim as another embodiment of the present invention.

Further, as another embodiment of the present invention, the wheel rim 20 for a vehicle as shown in FIG. 6 which is modified and improved from a conventional wheel rim, includes a rim bed 21; an inner rim flange 23 integrally and continuously connected with the rim bed 21; an outer rim flange 22 integrally and continuously connected with the rim bed 21, disposed on an opposite side of the inner rim flange 23; and further includes a rim pulley 24 integrally and continuously connected with and inwardly extended from the inner rim flange 23.

As a non-limiting and illustrative example, the rim bed 21 can be a central portion of the rim 20 and can define a well thereof. The inner rim flange 23 is integrally formed with the rim bed 21. Also, the outer rim flange 22 is integrally and continuously formed and connected with the rim bed 21, disposed on an opposite side of the inner rim flange 23.

Figure 7:
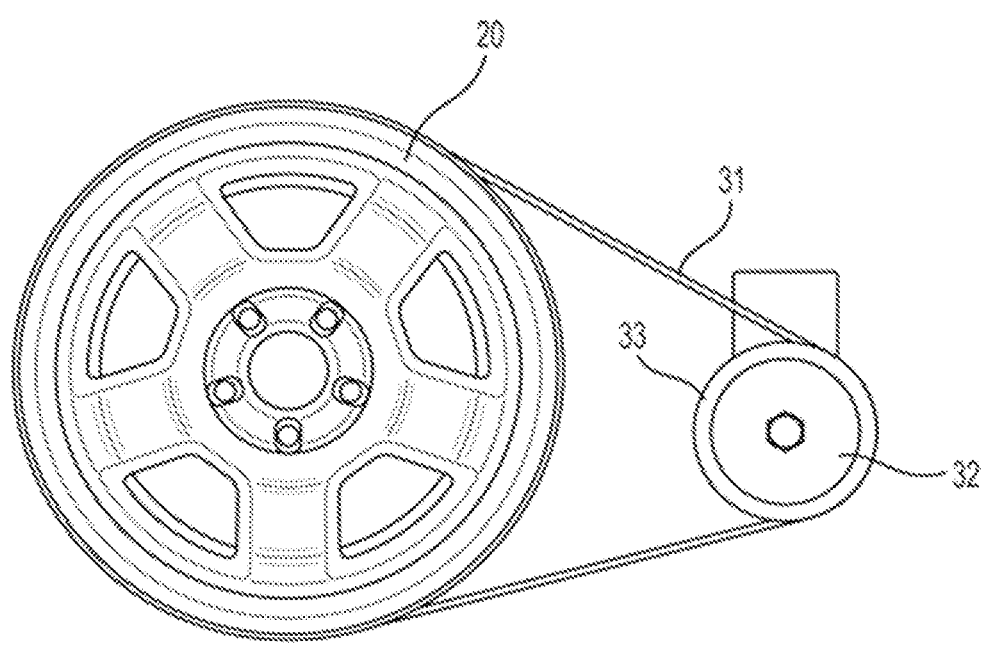
FIG. 7 is a side view of a vehicle power generating system as another embodiment of the present invention.

Furthermore, the rim pulley 24 is integrally formed with all of the inner rim flange 23, the rim bed 21 and the outer rim flange 22. That is the rim pulley 24 is integrally and continuously connected with and inwardly extended from the inner rim flange 23. This rim pulley 24 is not an individual or separate part from the wheel rim 20, but an integral part thereof, extended inwardly from the inner rim flange 23. Moreover, the rim pulley 23 has a groove (recess) 25 formed along the outer circumference thereof, such that it can work as a pulley for coupling with a belt 31 for rotating an alternator 32 or the small generator 40 as shown in FIGS. 6-7. In the alternative, instead of the belt 31, a gear may be used to connect the wheel rim 20 and the alternator 32 when the wheel rim 20 has gear teeth instead of the groove 25.

Further, as a non-limiting and illustrative example, as shown in FIG. 7, a vehicle power generating system can include the wheel rim 20 having the rim bed 21, the inner rim flange 23 integrally and continuously connected with the rim bed 21, and the rim pulley 24 integrally and continuously connected with and extended from the inner rim flange 23; the alternator 32 for generating electricity; and the belt 31 for connecting the rim pulley 24 with the alternator 32. The alternator 32 can include an alternator pulley 33, and the belt 31 is coupled with the alternator pulley 33, to generate electricity which can be used to operate the vehicle or to charge the battery 60.

This vehicle power generating system of FIG. 7 can be used in combination of the systems as described above and as shown in FIGS. 1-5. For example, in the system of FIG. 3, the tire 30 can be removed, but instead the wheel rim 20 of FIG. 6 can be used with the belt 31 to rotate the shaft 31 and then the generator 40 while the generator 50 can also generate power using the shaft 26. One skilled artisan can consider other combinations which can be also applicable to a vehicle when using the wheel rim and the system of FIGS. 6-7 with the systems of FIGS. 1-5.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A vehicle safety and electricity generating system for a vehicle, the system comprising:
   a wheel and tire assembly including a tire and a wheel rim;
   an axle shaft connected with the wheel rim;
   a first generator; and
   a second generator which is larger than the first generator in size and capacity,
   wherein the axle shaft has a first portion directly connected to the wheel rim and a second portion connected to the first portion and the second generator,
   wherein a diameter of the first portion is larger than that of the second portion,
   wherein the wheel rim includes:
   a rim bed;
   an inner rim flange integrally and continuously connected with the rim bed; and
   a rim pulley integrally and continuously connected with and extended from the inner rim flange, and
   wherein the rim pulley is connected with the first generator through a belt.

2. The system of claim 1, wherein the second portion of the axle shaft passes through the second generator.

3. The system of claim 1, wherein at least one of the first and second generators is connected to an automatic voltage rectifier.

4. The system of claim 3, wherein the vehicle is an electric vehicle, and the system is configured to generate electricity of 800-900 DC volts so as to charge batteries of the electric vehicle, by using the automatic voltage rectifier.

5. The system of claim 1, wherein, when the wheel rim rotates, the first and second generators produce electricity charged to a battery of the vehicle.

6. The system of claim 1, wherein the vehicle has a front axle shaft assembly disposed in a front portion thereof, a front-rear axle shaft assembly disposed in a rear portion thereof, and rear-rear axle shaft assembly disposed adjacent to and in rear of the front-rear axle shaft assembly, and the system is installed on the rear-rear axle shaft assembly for safety of rollover protection.

7. The system of claim 1, wherein the rim pulley includes a groove disposed on a circumference thereof, and the belt is coupled to the groove.

* * * * *